(12) United States Patent
Yang et al.

(10) Patent No.: US 8,972,761 B2
(45) Date of Patent: Mar. 3, 2015

(54) SYSTEMS AND METHODS FOR IDLE CLOCK INSERTION BASED POWER CONTROL

(75) Inventors: Shaohua Yang, Santa Clara, CA (US); Changyou Xu, Fremont, CA (US); Fan Zhang, Milpitas, CA (US)

(73) Assignee: LSI Corporation, San Jose, CA (US)

( * ) Notice: Subject to any disclaimer, the term of this patent is extended or adjusted under 35 U.S.C. 154(b) by 440 days.

(21) Appl. No.: 13/364,217

(22) Filed: Feb. 1, 2012

(65) Prior Publication Data

US 2013/0198554 A1 Aug. 1, 2013

(51) Int. Cl.
*G06F 1/32* (2006.01)

(52) U.S. Cl.
USPC ............................ 713/322; 713/320; 713/601

(58) Field of Classification Search
CPC ........ G06F 1/324; G06F 1/3268; G11B 19/02; G11B 19/209; Y02B 60/1217; Y02B 60/1246
See application file for complete search history.

(56) References Cited

U.S. PATENT DOCUMENTS

| 5,428,649 | A  | * | 6/1995  | Cecchi ............................ 375/372 |
| 5,544,138 | A  |   | 8/1996  | Bajorek et al. |
| 5,715,467 | A  |   | 2/1998  | Jirgal |
| 6,535,056 | B2 |   | 3/2003  | Mizumo |
| 6,748,039 | B1 | * | 6/2004  | Bates ............................ 375/354 |
| 6,804,792 | B2 |   | 10/2004 | Nishikawa |
| 6,973,583 | B2 |   | 12/2005 | Kobori |
| 6,983,389 | B1 |   | 1/2006  | Filippo |
| 7,049,771 | B2 |   | 5/2006  | Katanaya |
| 7,055,117 | B2 |   | 5/2006  | Yee |
| 7,203,857 | B2 |   | 4/2007  | Hamilton |
| 7,412,615 | B2 |   | 8/2008  | Yokota et al. |
| 7,529,958 | B2 |   | 5/2009  | Roth et al. |
| 7,739,533 | B2 |   | 6/2010  | Rauschmayer |
| 8,239,700 | B2 |   | 8/2012  | Nation |
| 8,245,061 | B2 |   | 8/2012  | Rauschmayer |
| 8,291,251 | B2 |   | 10/2012 | Rauschmayer |
| 2005/0144491 | A1 | * | 6/2005 | Zayas ............................ 713/300 |
| 2010/0268917 | A1 |   | 10/2010 | Nation et al. |
| 2010/0269074 | A1 |   | 10/2010 | Nation |

FOREIGN PATENT DOCUMENTS

| JP | 6152288    | 5/1994 |
| JP | 2003-099148 | 4/2003 |
| JP | 2004118240  | 4/2004 |

(Continued)

OTHER PUBLICATIONS

IBM, "Adaptive Power Management for Mobile Hard Drives", Apr. 1999, see www.almaden.ibm.com/almaden/mobile_hard_drives. html.

(Continued)

*Primary Examiner* — Dennis M Butler
(74) *Attorney, Agent, or Firm* — Hamilton DeSanctis & Cha

(57) ABSTRACT

The present inventions are related to systems and methods for data processing, and more particularly to systems and methods for power governance in a data processing system. In one particular case, a system is disclosed that includes a first data processing circuit operable to apply a data detection algorithm to a data input synchronous to a first clock, and a second data processing circuit operable to apply a subsequent data processing algorithm to an output derived from the first data processing circuit synchronous to a second clock, and an idle time enforcement circuit operable to modify an average frequency of at least one of the first clock and the second clock.

22 Claims, 6 Drawing Sheets

(56) References Cited

FOREIGN PATENT DOCUMENTS

| WO | WO 2004/023268 | 3/2004 |
|---|---|---|
| WO | WO 2004/109531 | 12/2004 |

OTHER PUBLICATIONS

U.S. Appl. No. 13/284,684, filed Oct. 28, 2011, Shaohua Yang, Unpublished.

U.S. Appl. No. 13/167,760, filed Jun. 24, 2011, Changyou Xu, Unpublished.

U.S. Appl. No. 13/227,557, filed Sep. 8, 2011, Shaohua Yang, Unpublished.

U.S. Appl. No. 13/167,764, filed Jun. 24, 2011, Zongwang Li, Unpublished.

U.S. Appl. No. 13/339,403, filed Dec. 29, 2011, Shaohua Yang, Unpublished.

* cited by examiner

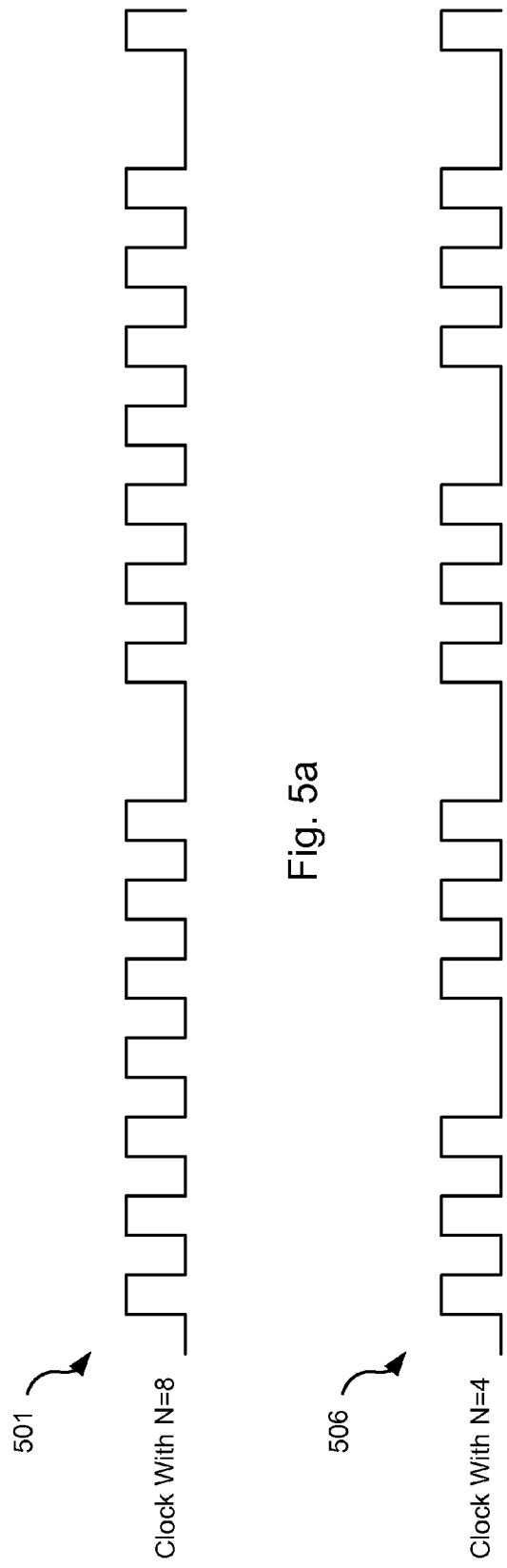

SYSTEMS AND METHODS FOR IDLE CLOCK INSERTION BASED POWER CONTROL

BACKGROUND OF THE INVENTION

The present inventions are related to systems and methods for data processing, and more particularly to systems and methods for power governance in a data processing system.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function uses a variable number of iterations depending upon the characteristics of the data being processed. The variable number of processing iterations result in ambiguity in determining circuit power requirements, and can require the choice of an expensive packaging designed to dissipate power at a higher rate than may actually be required.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for power governance in a data processing system.

Various embodiments of the present invention provide data processing systems that include a first data processing circuit, a second data processing circuit, and an idle time enforcement circuit. The first data processing circuit is operable to process a data input synchronous to a first clock, and the second data processing circuit is operable to process an output derived from the first data processing circuit synchronous to a second clock. The idle time enforcement circuit is operable to determine that the first data processing circuit and the second data processing circuit are concurrently operational, and based at least in part on determining that the first data processing circuit and the second data processing circuit are concurrently operational, to modify an average frequency of at least one of the first clock and the second clock. In various cases, only the first clock is modified. In other cases, only the second clock is modified. In some cases, the first clock and the second clock operate at the same frequency. In particular instances, the system is implemented as an integrated circuit. In some instances, the data processing system is incorporated in a storage device, or a data transmission device.

In some instances of the aforementioned embodiments, modifying the average frequency of at least one of the first clock and the second clock includes suppressing one clock cycle for each N clock cycles. In some cases, N is four. In other cases, N is eight. In various cases, N is user programmable.

In one or more instances of the aforementioned embodiments, the first data processing circuit is a data detector circuit operable to apply a data detection algorithm to the data input. Such data detector circuits may be, but are not limited to, a Viterbi algorithm data detector circuit, or a maximum a posteriori data detector circuit. In various cases, the second data processing circuit is a low density parity check decoder circuit.

In particular instances of the aforementioned embodiments, the system further includes a power monitor circuit operable to determine whether a power usage exceeds a threshold, and to assert a power status signal indicating that the power usage level exceeds the threshold. In some such instances, the idle time enforcement circuit is operable to modify an average frequency of at least one of the first clock and the second clock based at least in part on a combination of the first data processing circuit and the second data processing circuit concurrently operating, and assertion of the power status signal.

Other embodiments of the present invention provide methods for data processing that include: providing a data detector circuit; providing a data decoder circuit; applying a data detection algorithm synchronous to a first clock to a data input by the data detector circuit to yield a first detected output; applying a data decode algorithm synchronous to a second clock to a decode input derived from a second detected output to yield a decode output; determining that the data detector circuit is applying the data detection algorithm concurrent with applying the data decode algorithm; and based at least in part on the determination that the data detector circuit is applying the data detection algorithm concurrent with applying the data decode algorithm, reducing an average frequency of at least one of the first clock and the second clock.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 5a-5b are timing diagrams showing idle time enforcement described in FIGS. 4a-4b at different values of N.

DETAILED DESCRIPTION OF THE INVENTION

The present inventions are related to systems and methods for data processing, and more particularly to systems and methods for power governance in a data processing system.

Various embodiments of the present invention provide for power governance in a variable data processing system. As an example, a variable data processing system may include one or more data detector circuits and one or more data decoder circuits with the output of a data detector circuit being passed to a data decoder circuit for processing. At various operational times one or more of the data detector circuits and one or more of the decoder circuits are processing at the same time. This may result in excessive power usage. To avoid this situation, the embodiments of the present invention provide for idle time enforcement to mitigate power usage.

Figure 1:
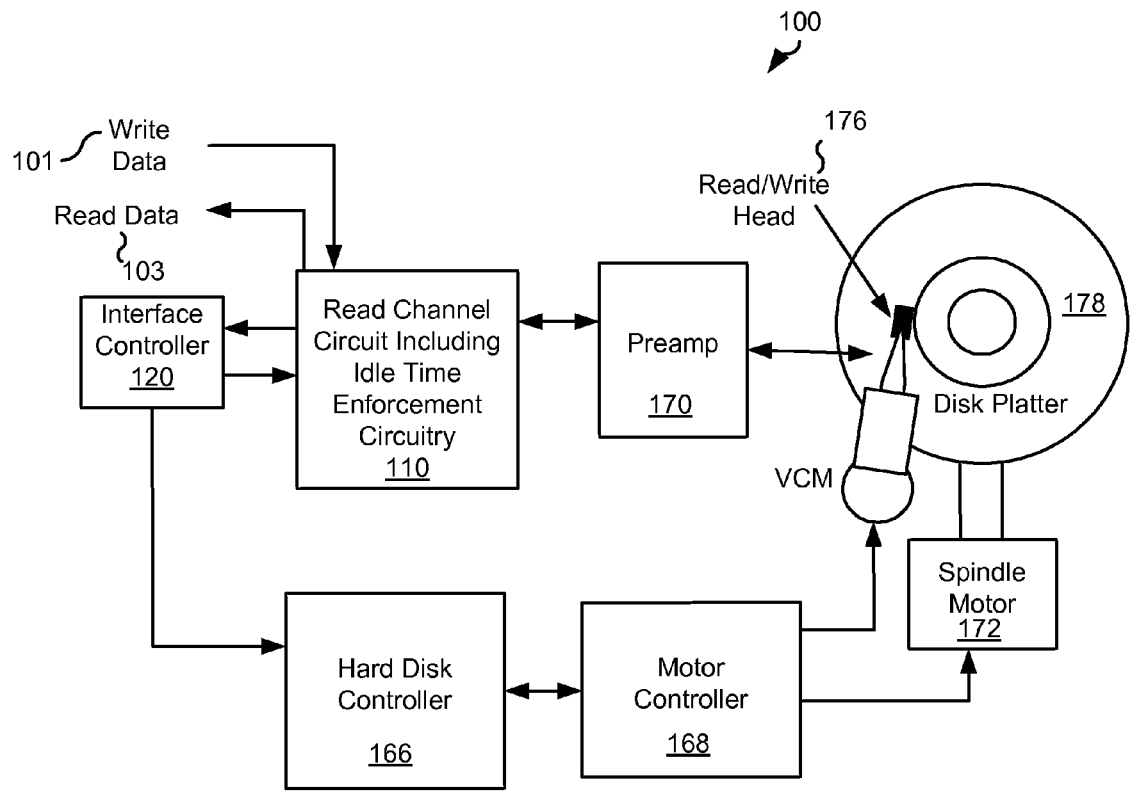
FIG. 1 shows a storage system including idle time enforcement circuitry in accordance with various embodiments of the present invention.

Turning to FIG. 1, a storage system 100 including a read channel circuit 110 including idle time enforcement circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 utilizes a variable data processing circuit that allows different portions of data to utilize different amounts of processing bandwidth and different combinations of data detector and/or data decoder circuits. Where too many data decoding or data detection circuits are used at the same time, an over current condition may occur. To avoid this over current condition, idle time is enforced in a data detection circuit, a data decoding circuit, or both a data detection circuit and a data decoding circuit. This idle time reduces the processing bandwidth of the affected circuits and at the same time reduces current demands of storage system 100. Read channel circuit 110 may be implemented to include a data processing circuit similar to that discussed below in relation to FIG. 3. Further, the enforcement of the idle time may be accomplished consistent with one of the approaches discussed below in relation to FIGS. 4a-4c.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Figure 2:
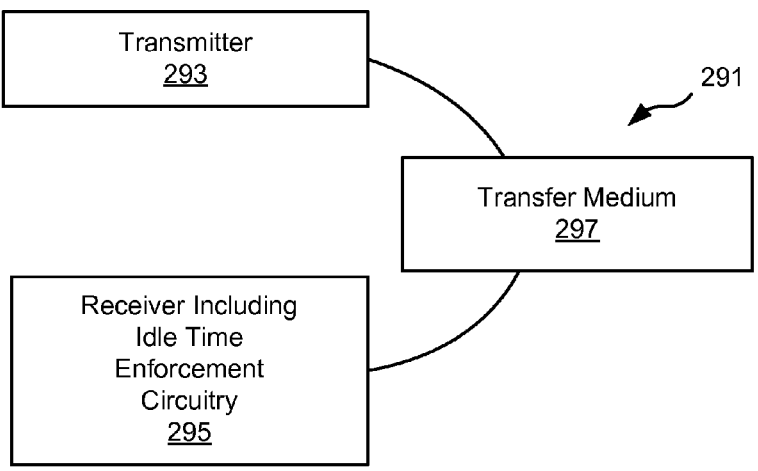
FIG. 2 depicts a data transmission system including idle time enforcement circuitry in accordance with one or more embodiments of the present invention.

Turning to FIG. 2, a data transmission system 291 including a receiver 295 having idle time enforcement circuitry is shown in accordance with various embodiments of the present invention. Data transmission system 291 includes a transmitter 293 that is operable to transmit encoded information via a transfer medium 297 as is known in the art. The encoded data is received from transfer medium 297 by a receiver 295. Receiver 295 processes the received input to yield the originally transmitted data. As part of processing the received information, receiver 295 utilizes a variable data processing circuit that allows different chunks of data to utilize different amounts of processing bandwidth and utilizing different combinations of data detector and/or data decoder circuits. Where too many data decoding or data detection circuits are used at the same time, an over current condition may occur. To avoid this over current condition, idle time is enforced in a data detection circuit, a data decoding circuit, or both a data detection circuit and a data decoding circuit. This idle time reduces the processing bandwidth of the affected circuits and at the same time reduces current demands of receiver 295. Receiver 295 may be implemented to include a data processing circuit similar to that discussed below in relation to FIG. 3. Further, the enforcement of the idle time may be accomplished consistent with one of the approaches discussed below in relation to FIGS. 4a-4c.

Figure 3:
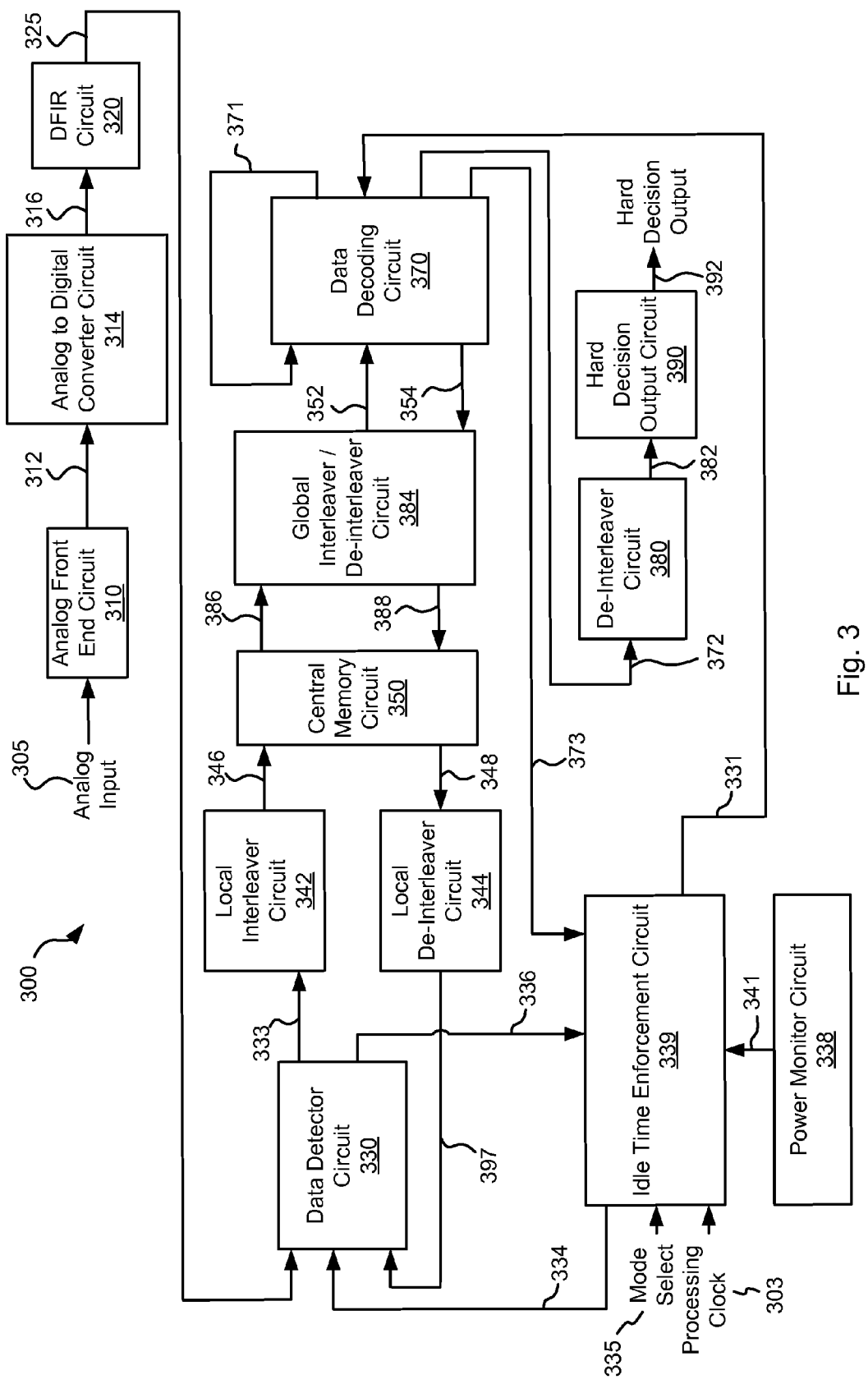
FIG. 3 shows a data processing circuit including an idle time enforcement circuit in accordance with some embodiments of the present invention.

FIG. 3 shows a data processing circuit 300 including an idle time enforcement circuit 339 in accordance with some embodiments of the present invention. Data processing circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. In some cases, equalizer 320 includes sufficient memory to maintain one or more codewords until processing of that codeword is completed through a data detector circuit 330 and a data decoding circuit 370 including, where warranted, multiple global iterations (passes through both data detector circuit 330 and data decoding circuit 370) and/or local iterations (passes through data decoding circuit 370 during a given global iteration). It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. In some embodiments of the present invention, data detector circuit 330 is a Viterbi algorithm data detector circuit as are known in the art. In other embodiments of the present invention, data detector circuit 330 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Upon completion of application of the data detection algorithm to the received codeword on the first global iteration, data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once a data decoding circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into data decoding circuit 370. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 370 applies a data decode algorithm to decoder input 352 to yield a decoded output 371. In cases where another local iteration (i.e., another pass trough data decoder circuit 370) is desired, data decoding circuit 370 re-applies the data decode algorithm to decoder input 352 guided by decoded output 371. This continues until either a maximum number of local iterations is exceeded or decoded output 371 converges.

Where decoded output 371 fails to converge (i.e., fails to yield the originally written data set) and a number of local iterations through data decoder circuit 370 exceeds a threshold, the resulting decoded output is provided as a decoded output 354 back to central memory circuit 350 where it is stored awaiting another global iteration through a data detector circuit included in data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order. The originally ordered data sets are then provided as a hard decision output 392.

Idle time enforcement circuit 339 monitors an operational status signal 336 from data detector circuit 330 and an operational status signal 373 from data decoding circuit 370. Idle time enforcement circuit 339 provides a detector clock 334 that synchronizes operation of data detector circuit 330 and a decoder clock 331 that synchronizes operation of data decoding circuit 370. Idle time enforcement circuit 339 adjusts decoder clock 331 and/or detector clock 334 based upon the operational status of data detector circuit 330 and data decoding circuit 370. In some cases, one out of each N clock cycles of a processing clock 303 is skipped with N being determined by a mode select input 335. In some cases, mode select input 335 is user programmable. In one particular embodiment of the present invention, mode select input 335 selects a value of N of either four or eight, and selects whether the clock adjustment relies on a power status signal 341 from a power monitor circuit 338. Power monitor circuit 338 monitors power usage by data processing circuit 300 to yield power status signal 341. Power monitor circuit 338 may be any circuit known in the art that is capable of making an approximate determination of power utilization or over current conditions by a circuit. Where power monitor circuit 338 determines that power usage or current levels have exceeded a threshold, power status signal 341 is asserted.

The following pseudo-code describes an operation of idle time enforcement circuit 339 that relies on operational status signal 336 and operational status signal 373, but not on power status signal 341.

```
If (Operational Status Signal 336 is asserted && Operational Status
Signal 373 is asserted)
{
    Increment Count of Processing Clock 303;
    If (Count is equal to N) {
        If (Mode Select Indicates Suppression of Detector Clock 334) {
            Suppress current cycle of Detector Clock 334
        }
        Else {
            Provide Processing Clock 303 as Detector Clock 334
        }
        If (Mode Select Indicates Suppression of Decoder Clock 331) {
            Suppress current cycle of Decoder Clock 331
        }
        Else {
            Provide Processing Clock 303 as Decoder Clock 331
        }
    }
    Else {
        Provide Processing Clock 303 as Detector Clock 334;
        Provide Processing Clock 303 as Decoder Clock 331
    }
}
Else {
    Provide Processing Clock 303 as Detector Clock 334;
    Provide Processing Clock 303 as Decoder Clock 331
}
```

As some examples, N may be equal to four or eight. In some cases, the value of N may be programmable. Based upon the disclosure provided herein, one of ordinary skill in the art will recognize a variety of values that may be used for N.

The following pseudo-code describes an operation of idle time enforcement circuit 339 that relies on operational status signal 336, operational status signal 373, and status signal 341.

```
If ( Status signal 341 is asserted &&
     Operational Status Signal 336 is asserted &&
     Operational Status Signal 373 is asserted)
{
    Increment Count of Processing Clock 303;
    If (Count is equal to N) {
        If (Mode Select Indicates Suppression of Detector Clock 334) {
            Suppress current cycle of Detector Clock 334
        }
        Else {
            Provide Processing Clock 303 as Detector Clock 334
        }
        If (Mode Select Indicates Suppression of Decoder Clock 331) {
            Suppress current cycle of Decoder Clock 331
        }
        Else {
            Provide Processing Clock 303 as Decoder Clock 331
        }
    }
    Else {
        Provide Processing Clock 303 as Detector Clock 334;
        Provide Processing Clock 303 as Decoder Clock 331
    }
}
Else {
    Provide Processing Clock 303 as Detector Clock 334;
    Provide Processing Clock 303 as Decoder Clock 331
}
```

As some examples, N may be equal to four or eight. In some cases, the value of N may be programmable. Based upon the disclosure provided herein, one of ordinary skill in the art will recognize a variety of values that may be used for N.

Figure 4A:
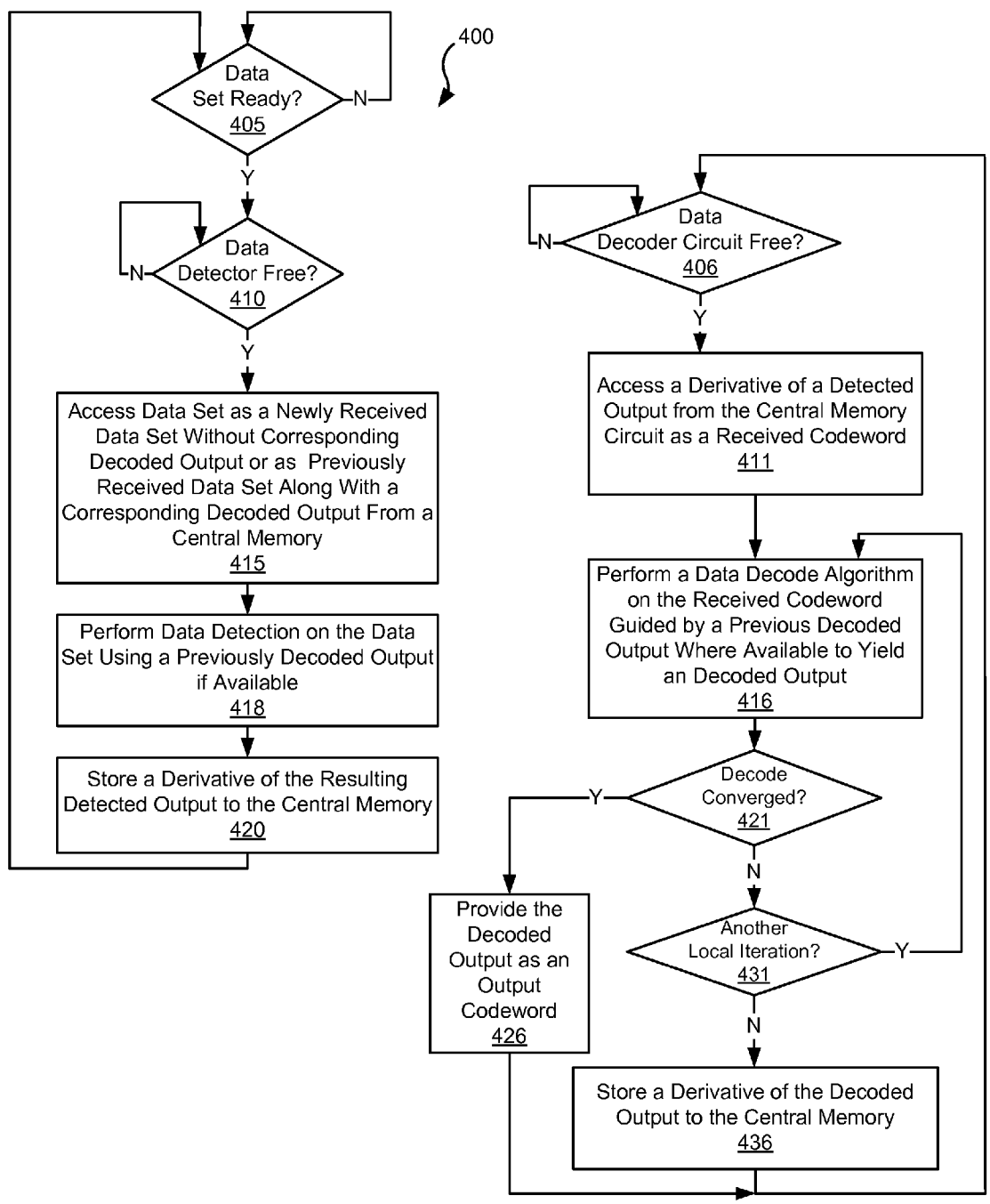
FIG. 4a is a flow diagram showing a method for variable data processing through data decoder and data detection circuitry.

FIG. 4a is a flow diagram showing a process for variable data processing through a data detector circuit and a data decoder circuit. Following flow diagram 400, it is determined whether a data set is ready for application of a data detection algorithm (block 405). In some cases, a data set is ready when it is received from a data decoder circuit via a central memory circuit. In other cases, a data set is ready for processing when it is first made available from an front end processing circuit. Where a data set is ready (block 405), it is determined whether a data detector circuit is available to process the data set (block 410).

Where the data detector circuit is available for processing (block 410), the data set is accessed by the available data detector circuit (block 415). The data detector circuit may be, for example, a Viterbi algorithm data detector circuit or a maximum a posteriori data detector circuit. Where the data set is a newly received data set (i.e., a first global iteration), the newly received data set is accessed. In contrast, where the data set is a previously received data set (i.e., for the second or later global iterations), both the previously received data set and the corresponding decode data available from a preceding global iteration (available from a central memory) is accessed. The accessed data set is then processed by application of a data detection algorithm to the data set (block 418). Where the data set is a newly received data set (i.e., a first global iteration), it is processed without guidance from decode data available from a data decoder circuit. Alternatively, where the data set is a previously received data set (i.e., for the second or later global iterations), it is processed with guidance of corresponding decode data available from preceding global iterations. Application of the data detection algorithm yields a detected output. A derivative of the detected output is stored to the central memory (block 420). The derivative of the detected output may be, for example, an interleaved or shuffled version of the detected output.

In parallel to the previously described data detection process, it is determined whether a data decoder circuit is available (block 406). The data decoder circuit may be, for example, a low density data decoder circuit as are known in the art. Where the data decoder circuit is available (block 406), a previously stored derivative of a detected output is accessed from the central memory and used as a received codeword (block 411). A data decode algorithm is applied to the received codeword to yield a decoded output (block 416). Where a previous local iteration has been performed on the received codeword, the results of the previous local iteration (i.e., a previous decoded output) are used to guide application of the decode algorithm. It is then determined whether the decoded output converged (i.e., resulted in the originally written data) (block 421). Where the decoded output converged (block 421), it is provided as a decoded output (block 426). Alternatively, where the decoded output failed to converge (block 421), it is determined whether another local iteration is desired (block 431). In some cases, four local iterations are allowed per each global iteration. Based upon the disclosure provided herein, one of ordinary skill in the art will recognize another number of local iterations that may be used in relation to different embodiments of the present invention. Where another local iteration is desired (block 431), the processes of blocks 406-431 are repeated for the codeword. Alternatively, where another local iteration is not desired (block 431), a derivative of the decoded output is stored to the central memory (block 436). The derivative of the decoded output being stored to the central memory triggers the data set ready query of block 405 to begin the data detection process.

Figure 4B:
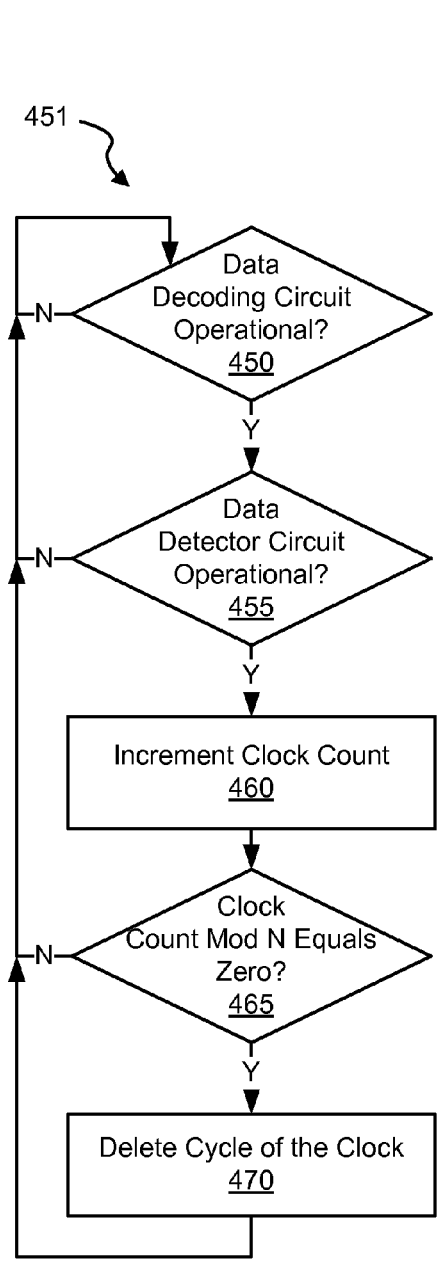
FIG. 4b is a flow diagram showing a method for enforcing idle time in conjunction with the method of FIG. 4a in accordance with some embodiments of the present invention.

In some embodiments of the present invention during the aforementioned data decoding and data detection processing described above in relation to FIG. 4a, the clock provided to one or both of the data detection circuit or the data decoding circuit is generated in accordance with the method described in a flow diagram 451 of FIG. 4b. Following flow diagram 451, it is determined whether the data decoding circuit is operational (block 450). The data decoding circuit is considered operational when it is actively applying a data decode algorithm to a data set. Where the data decoding circuit is operational (block 450), it is determined whether the data detector circuit is operational (block 455). The data detector circuit is considered operational when it is actively applying a data decode algorithm to a data set. Where it is determined that the data detector circuit is operational (block 455) a clock count is incremented (block 460). The clock count modulus N is then determined, and where the clock count modulus N is equal to zero (block 465), the current cycle of one or both of a clock synchronizing operation of the data detector circuit and/or a clock synchronizing operation of the data decoding circuit is deleted or suppressed (block 470).

Thus, the method of flow diagram 451 operates to suppress one of each N clock cycles to one or both of data detector circuit or data decoding circuit where both the data detector circuit and the data decoder circuit are concurrently operational. An example of such clock suppression where the value of N is eight is shown as a timing diagram 501 of FIG. 5a. Another example of such clock suppression where the value of N is eight is shown as a timing diagram 506 of FIG. 5b.

Figure 4C:
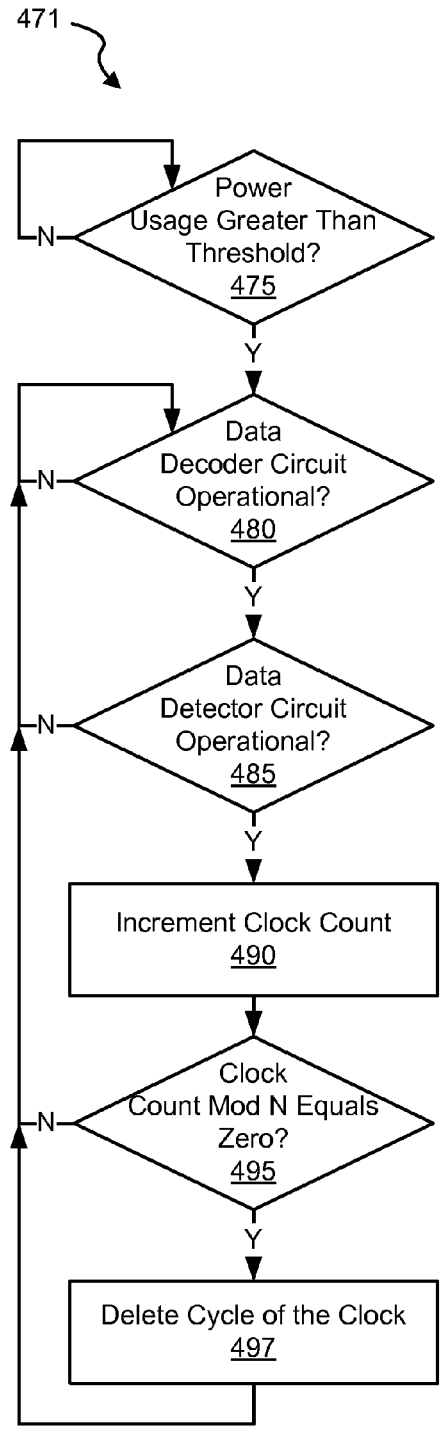
FIG. 4c is a flow diagram showing another method for enforcing idle time in conjunction with the method of FIG. 4a in accordance with other embodiments of the present invention.

In other embodiments of the present invention during the aforementioned data decoding and data detection processing described above in relation to FIG. 4a, the clock provided to one or both of the data detection circuit or the data decoding circuit is generated in accordance with the method described in a flow diagram 471 of FIG. 4c. Following flow diagram 471, it is determined whether a power usage has exceeded a threshold level (block 475). In some cases, the threshold level is programmable. Where the threshold level is exceeded (block 475), it is determined whether the data decoding circuit is operational (block 480). The data decoding circuit is considered operational when it is actively applying a data decode algorithm to a data set. Where the data decoding circuit is operational (block 480), it is determined whether the data detector circuit is operational (block 485). The data detector circuit is considered operational when it is actively applying a data decode algorithm to a data set. Where it is determined that the data detector circuit is operational (block 485) a clock count is incremented (block 490). The clock count modulus N is then determined, and where the clock count modulus N is equal to zero (block 495), the current cycle of one or both of a clock synchronizing operation of the data detector circuit and/or a clock synchronizing operation of the data decoding circuit is deleted or suppressed (block 497). Thus, the method of flow diagram 471 operates to suppress one of each N clock cycles to one or both of data detector circuit or data decoding circuit where both the data detector circuit and the data decoder circuit are concurrently operational at a time where an excessive power condition is ongoing. An example of such clock suppression where the value of N is eight is shown as a timing diagram 501 of FIG. 5a. Another example of such clock suppression where the value of N is eight is shown as a timing diagram 506 of FIG. 5b.

Figure 6A:
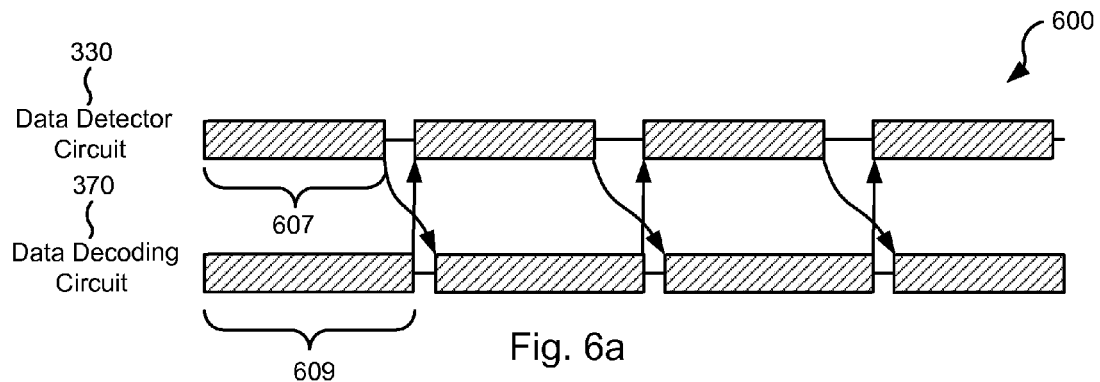
FIGS. 6a-6c graphically show processing changes due to different idle time enforcement described in relation to FIGS. 4a-4b.
Figure 6B:
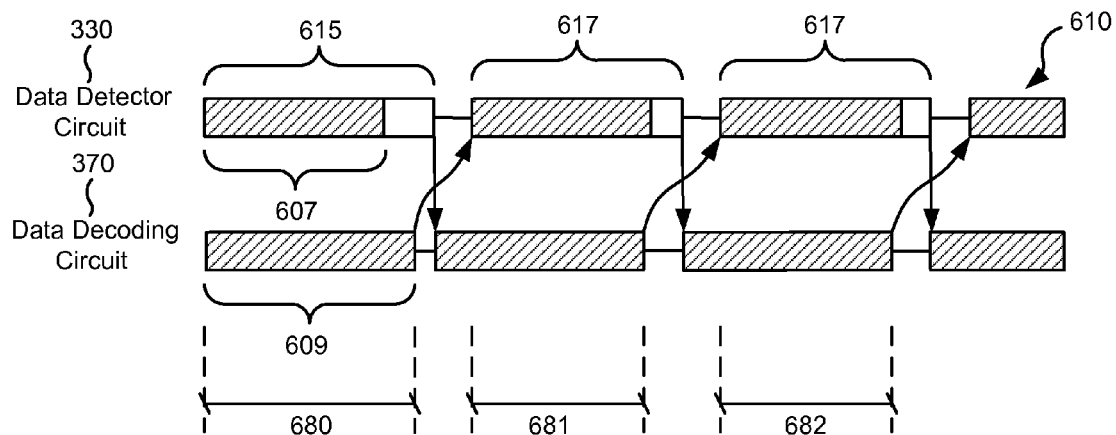
Figure 6C:
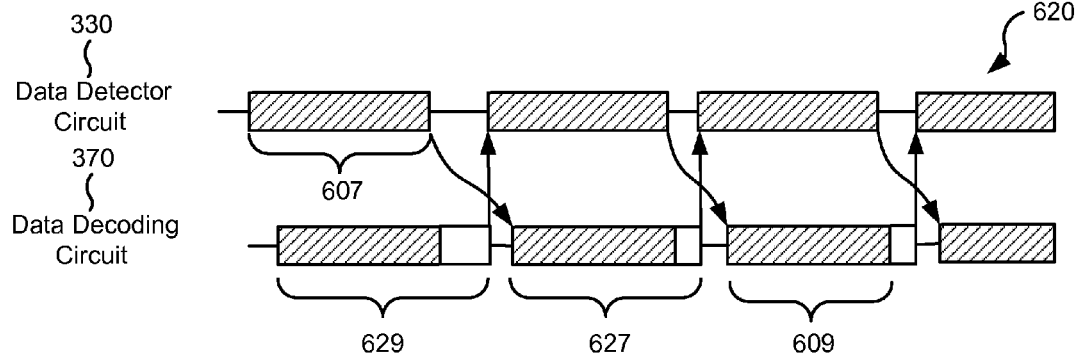

Turning to FIGS. 6a-6c, processing changes due to different idle time enforcement processes are graphically shown in timing diagrams 600, 610, 620. Referring specifically to FIG. 6a, operation of data detector circuit 330 is shown by shaded regions of a duration 607. operation of data decoding circuit 330 is shown by shaded regions of a duration 609. The operational regions are separated by non-operational regions indicated by a straight line. The non-operational regions may represent low level operation such as data loading and unloading, or delay periods. The operational regions indicate the ongoing application of a data decode algorithm or a data detection algorithm. Of note, the next operational period of data detector circuit 330 relies on completion of a previous operational period of data decoding circuit 370, and the next operational period of data decoding circuit 370 relies on completion of a previous operational period of data detection period circuit 330.

Referring specifically to FIG. 6b, operation of data detector circuit 330 is shown by combination regions of a duration 615 or a duration 617. The combination regions include a shaded region of a duration 609 that represents the duration of processing required by data detector circuit 330 if the clock is not suppressed, and a non-shaded region that represents the additional duration of processing required because the clock is suppressed. The non-shaded region may increase or decrease depending upon the amount of overlap between data decoding circuit 370 and data detection circuit 330 and/or the occurrence of a power usage exceeding a threshold value. Again, the next operational period of data detector circuit 330 relies on completion of a previous operational period of data decoding circuit 370, and the next operational period of data decoding circuit 370 relies on completion of a previous operational period of data detection period circuit 330. Of note, the clock period for data detector circuit 330 is extended (i.e., the processing is delayed) during the period of overlap between data detector circuit 330 and data decoding circuit 370 as shown by periods 680, 681, 682. The longer periods 680, 681, 682 are, the longer the un-shaded portion of the blocks corresponding to data detector circuit 330.

Referring specifically to FIG. 6c, operation of data decoding circuit 370 is shown by combination regions of a duration 627 or a duration 629. The combination regions include a shaded region of a duration 609 that represents the duration of processing required by data decoding circuit 330 if the clock is not suppressed, and a non-shaded region that represents the additional duration of processing required because the clock is suppressed. The non-shaded region may increase or decrease depending upon the amount of overlap between data decoding circuit 370 and data detection circuit 330 and/or the occurrence of a power usage exceeding a threshold value. Again, the next operational period of data detector circuit 330 relies on completion of a previous operational period of data decoding circuit 370, and the next operational period of data decoding circuit 370 relies on completion of a previous operational period of data detection period circuit 330.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/ or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for power governance. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a first data processing circuit operable to apply a data detection algorithm to a data input synchronous to a first clock;
    a second data processing circuit operable to apply a subsequent data processing algorithm to an output derived from the first data processing circuit synchronous to a second clock; and
    an idle time enforcement circuit operable to determine that the first data processing circuit and the second data processing circuit are concurrently operational, and based at least in part on determining that the first data processing circuit and the second data processing circuit are concurrently operational, to modify an average frequency of at least one of the first clock and the second clock by suppressing one cycle for each N clock cycles of at least one of the first clock and the second clock.

2. The data processing system of claim 1, wherein N is selected from a group consisting of: four and eight.

3. The data processing system of claim 1, wherein N is user programmable.

4. The data processing system of claim 1, wherein the first data processing circuit is a data detector circuit selected from a group consisting of: a Viterbi algorithm data detector circuit, and a maximum a posteriori data detector circuit.

5. The data processing system of claim 4, wherein the second data processing circuit is a low density parity check decoder circuit, and wherein the subsequent data processing algorithm is a low density parity check algorithm.

6. The data processing system of claim 1, wherein the system further comprises:
    a power monitor circuit operable to determine whether a power usage exceeds a threshold, and to assert a power status signal indicating that the power usage level exceeds the threshold; and
    wherein the idle time enforcement circuit is operable to modify an average frequency of at least one of the first clock and the second clock based at least in part on a combination of the first data processing circuit and the second data processing circuit concurrently operating, and assertion of the power status signal.

7. The data processing system of claim 1, wherein only the first clock is modified.

8. The data processing system of claim 1, wherein only the second clock is modified.

9. The data processing system of claim 1, wherein the system is implemented as an integrated circuit.

10. The data processing system of claim 1, wherein the data processing system is incorporated in a device selected from a group consisting of: a storage device, and a data transmission device.

11. The data processing system of claim 1, wherein the first clock and the second clock operate at the same frequency.

12. A method for data processing, the method comprising:
    providing a data detector circuit;
    providing a data decoder circuit;
    applying a data detection algorithm synchronous to a first clock to a data input by the data detector circuit to yield a first detected output;
    applying a data decode algorithm synchronous to a second clock to a decode input derived from a second detected output to yield a decode output;
    determining that the data detector circuit is applying the data detection algorithm concurrent with applying the data decode algorithm; and
    based at least in part on the determination that the data detector circuit is applying the data detection algorithm concurrent with applying the data decode algorithm, reducing an average frequency of at least one of the first clock and the second clock.

13. The method of claim 12, reducing the average frequency of at least one of the first clock and the second clock includes suppressing one clock cycle for each N clock cycles.

14. The method of claim 13, wherein N is selected from a group consisting of: four and eight.

15. The method of claim 13, wherein N is user programmable.

16. The method of claim 12, where the data decoder circuit is a low density parity check decoder circuit, and wherein the data detector circuit is selected from a group consisting of: a Viterbi algorithm data detector circuit, and a maximum a posteriori data detector circuit.

17. The method of claim 12, wherein the method further comprises:
    determining that a power usage exceeds a threshold level; and wherein reducing the average frequency of the at least one of the first clock and the second clock is based on a combination of concurrent operation of the data detector circuit and the data decoding circuit, and determining that the power usage exceeds the threshold level.

18. The method of claim 12, wherein the first clock and the second clock operate at the same frequency.

19. A storage device, the storage device comprising:
  a storage medium;
  a head assembly disposed in relation to the storage medium and operable to provide a sensed signal corresponding to information on the storage medium;
  a read channel circuit including:
  an analog to digital converter circuit operable to sample an analog signal derived from the sensed signal to yield a series of digital samples;
  an equalizer circuit operable to equalize the digital samples to yield a first data set;
  a data detector circuit operable to apply a data detection algorithm to the first data set synchronous to a first clock;
  a data decoding circuit operable to apply a data decode algorithm to process an output derived from the data detector circuit synchronous to a second clock; and
  an idle time enforcement circuit operable to determine that the data detector circuit and the data decoding circuit are concurrently operational, and based at least in part on determining that the data detector circuit and the data decoding circuit are concurrently operational, to modify an average frequency of at least one of the first clock and the second clock.

20. A data processing system, the data processing system comprising:
  a first data processing circuit configured to apply a data detection algorithm to a data input synchronous to a first clock;
  a second data processing circuit configured to apply a subsequent data processing algorithm to an output derived from the first data processing circuit synchronous to a second clock;
  an idle time enforcement circuit configured to determine that the first data processing circuit and the second data processing circuit are concurrently operational, and based at least in part on determining that the first data processing circuit and the second data processing circuit are concurrently operational, to modify an average frequency of at least one of the first clock and the second clock; and
  wherein the first data processing circuit is a data detector circuit selected from a group consisting of: a Viterbi algorithm data detector circuit, and a maximum a posteriori data detector circuit.

21. The data processing system of claim 20, wherein the system further comprises:
  a power monitor circuit configured to determine whether a power usage exceeds a threshold, and to assert a power status signal indicating that the power usage level exceeds the threshold; and
  wherein the idle time enforcement circuit is configured to modify an average frequency of at least one of the first clock and the second clock based at least in part on a combination of the first data processing circuit and the second data processing circuit concurrently operating, and assertion of the power status signal.

22. A data processing system, the data processing system comprising:
  a first data processing circuit configured to apply a data detection algorithm to a data input synchronous to a first clock;
  a second data processing circuit configured to apply a subsequent data processing algorithm to an output derived from the first data processing circuit synchronous to a second clock;
  an idle time enforcement circuit configured to determine that the first data processing circuit and the second data processing circuit are concurrently operational, and based at least in part on determining that the first data processing circuit and the second data processing circuit are concurrently operational, to modify an average frequency of at least one of the first clock and the second clock; and
  wherein the system is implemented as an integrated circuit.

* * * * *